(12) United States Patent
Hunt et al.

(10) Patent No.: US 9,317,302 B2
(45) Date of Patent: Apr. 19, 2016

(54) METHOD AND ALGORITHM FOR CONTENT LAYOUT ACROSS DIVERSE AND DYNAMIC DISPLAYS

(75) Inventors: Christian L. Hunt, Cary, NC (US); Charles Le Vay, Cary, NC (US); Ethan K. Merrill, Durham, NC (US); Jake Palmer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1539 days.

(21) Appl. No.: 11/342,769

(22) Filed: Jan. 30, 2006

(65) Prior Publication Data
US 2007/0180362 A1 Aug. 2, 2007

(51) Int. Cl.
G06F 3/048 (2013.01)
G06F 9/44 (2006.01)

(52) U.S. Cl.
CPC ............. *G06F 9/4443* (2013.01); *G06F 3/048* (2013.01)

(58) Field of Classification Search
CPC ...................................................... G06F 3/048
USPC ................................................. 715/517, 243
See application file for complete search history.

(56) References Cited

U.S. PATENT DOCUMENTS

| | | | |
|---|---|---|---|
| 5,721,848 A | 2/1998 | Joseph | |
| 5,754,174 A * | 5/1998 | Carpenter et al. | 715/810 |
| 6,400,375 B1 | 6/2002 | Okudaira | |
| 6,476,828 B1 | 11/2002 | Burkett et al. | |
| 6,556,217 B1 | 4/2003 | Makipaa et al. | |
| 6,603,493 B1 | 8/2003 | Lovell et al. | |
| 6,717,593 B1 * | 4/2004 | Jennings | 715/760 |
| 6,738,079 B1 * | 5/2004 | Kellerman et al. | 715/763 |
| 6,941,521 B2 * | 9/2005 | Lin et al. | 715/762 |
| 7,434,164 B2 * | 10/2008 | Salesin et al. | 715/731 |
| 2002/0007279 A1 * | 1/2002 | Matsuda et al. | 704/277 |
| 2002/0065110 A1 | 5/2002 | Enns et al. | |
| 2002/0116418 A1 | 8/2002 | Lachhwani et al. | |
| 2003/0063120 A1 * | 4/2003 | Wong et al. | 345/746 |
| 2005/0057560 A1 | 3/2005 | Bibr et al. | |

OTHER PUBLICATIONS

Herrod, J.A., *Variable Windowing Implementations*; IBM Technical Disclosure Bulletin; vol. 32, No. 8B, Jan. 1990.

\* cited by examiner

*Primary Examiner* — Laurie Ries
*Assistant Examiner* — Tionna Burke
(74) *Attorney, Agent, or Firm* — Steven M. Greenberg, Esq.; CRGO Law

(57) ABSTRACT

Embodiments of the present invention address deficiencies of the art in respect to content layout in a pervasive device display and provide a method, system and computer program product for the dynamic selection of a content layout for content in a pervasive device display. In one embodiment of the invention, a dynamic content layout method for pervasive devices can include obtaining display characteristics for a host pervasive device, locating a layout mode corresponding to the obtained display characteristics, and arranging panels of a graphical user interface for an application in the host pervasive device according to the located layout mode.

16 Claims, 3 Drawing Sheets

METHOD AND ALGORITHM FOR CONTENT LAYOUT ACROSS DIVERSE AND DYNAMIC DISPLAYS

BACKGROUND OF THE INVENTION

1. Field of the Invention

The present invention relates to the field content display in a pervasive device and more particularly to establishing a content layout in a pervasive device.

2. Description of the Related Art

The conventional graphical user interface (GUI) has been widely used for many years. The primary function of the GUI includes providing user interface controls with which the end-user can interact with an underlying application, and presenting content and decorative features provided by the underlying application. For most fixed computing devices, including personal computers, there is little practical limit of the amount of content which can be displayed within the GUI for an application. As such, the selection of content layout for content in a GUI is not of paramount importance—at least from the perspective of display space. The same is not true of other computing devices.

More particularly, when content is displayed in a GUI in some computing devices, often one must compromise between the amount of information which can be displayed within the GUI display, and the amount of displayable space within the GUI display in which a preferred amount of information can be presented. Where the display area must be reduced due to height and width constraints, information that otherwise might be easily grouped and viewed in within a larger display space often cannot be presented as a single, cohesive set of interrelated interface elements. This circumstance has been known to arise in the use of pervasive devices, including handheld computers and portable cellular telephones.

"Pervasive computing" refers to any non-constrained computing device not physically tethered to a data communications network. Thus, pervasive computing devices refer not only to computers wirelessly linked to networks, but also to handheld computing devices, wearable systems, embedded computing systems and the like. Importantly, pervasive device. In the case of pervasive devices, the display area sometimes can be limited to as little as a 160 pixel by 160 pixel region or less.

New technologies address the constraints of pervasive device displays in a number of ways. Most notably, many applications intended for deployment in a pervasive device provide for the static arrangement of content sections in a content layout to maximize the readability of the GUI for a pervasive application. Yet, the display constraints of different pervasive devices can vary as much as the devices themselves. Specifically, some displays in pervasive devices are square and some rectangular with optional portrait and landscape viewing modes. Accordingly, a statically defined content layout for one pervasive device may not suit another.

To accommodate all of the different viewing modes provided by the displays of different pervasive devices, the content layout for a GUI of a pervasive application must be modified at the code level for optimization for any particular display in a pervasive device. Alternatively, the pervasive device itself can permit the end user to manually select a display mode for an application in terms of column views or desktop views irrespective of the desired content layout of the pervasive application. In the latter circumstance, however, an optimal use of display space in the pervasive device can be sacrificed at the expense of a dynamic selection of display mode. Furthermore, the content layout specified for the GUI of the pervasive application must conform to the selected display mode, often producing an awkward GUI in the display.

BRIEF SUMMARY OF THE INVENTION

Embodiments of the present invention address deficiencies of the art in respect to content layout in a pervasive device display and provide a novel and non-obvious method, system and computer program product for the dynamic selection of a content layout for content in a pervasive device display. In one embodiment of the invention, a dynamic content layout method for pervasive devices can include obtaining display characteristics for a host pervasive device, locating a layout mode corresponding to the obtained display characteristics, and arranging panels of a graphical user interface for an application in the host pervasive device according to the located layout mode.

Preferably, the method further can include re-arranging panels of a graphical user interface for an application in the host pervasive device according to a located layout mode for display characteristics of the display of the pervasive device responsive to detecting one of a refresh event and a rendering event. In one aspect of the embodiment, the method further can include parsing a layout specification defined in markup and creating a layout mode object for each layout mode defined in the layout specification. In this regard, locating a layout mode corresponding to the obtained display characteristics can include matching the display characteristics to corresponding display attributes for each created layout mode object.

Arranging panels of a graphical user interface for an application in the host pervasive device according to the located layout mode can include identifying a number of rows for display in the pervasive device, and particular ones of the panels to be placed in selected ones of the identified rows. The method further can include inserting the selected ones of the panels in corresponding rows specified by the located layout mode. The method yet further can include determining a transition from one layout mode to another in the layout specification, detecting a refresh event implicating the determined transition, and re-arranging the panels of the graphical user interface for the application in the host pervasive device according to a layout mode specified by the transition.

In another embodiment of the invention, a pervasive data processing system can include an application server and multiple applications managed for distribution by the application server. Each of the applications can implement a layout manager interface. The system also can include a layout specification for each application. Each layout specification can define layout modes for a graphical user interface for a corresponding one of the applications. Finally, the system can include a factory including program code enabled to generate the graphical user interface based upon the layout specification.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic content layout selection for pervasive device displays. In accordance with an embodiment of the present invention, a different content layout can be defined for each of a selection of different pervasive device displays. The content layout can specify a number of rows of content panels to be rendered in a display, and also the number of content panels to be rendered in any particular row. At runtime, client side logic in the pervasive device can match the display capabilities of the display with the selection to identify a desirable content layout for the display. Subsequently, the identified content layout can be applied to content for an application in the pervasive device.

Figure 1:
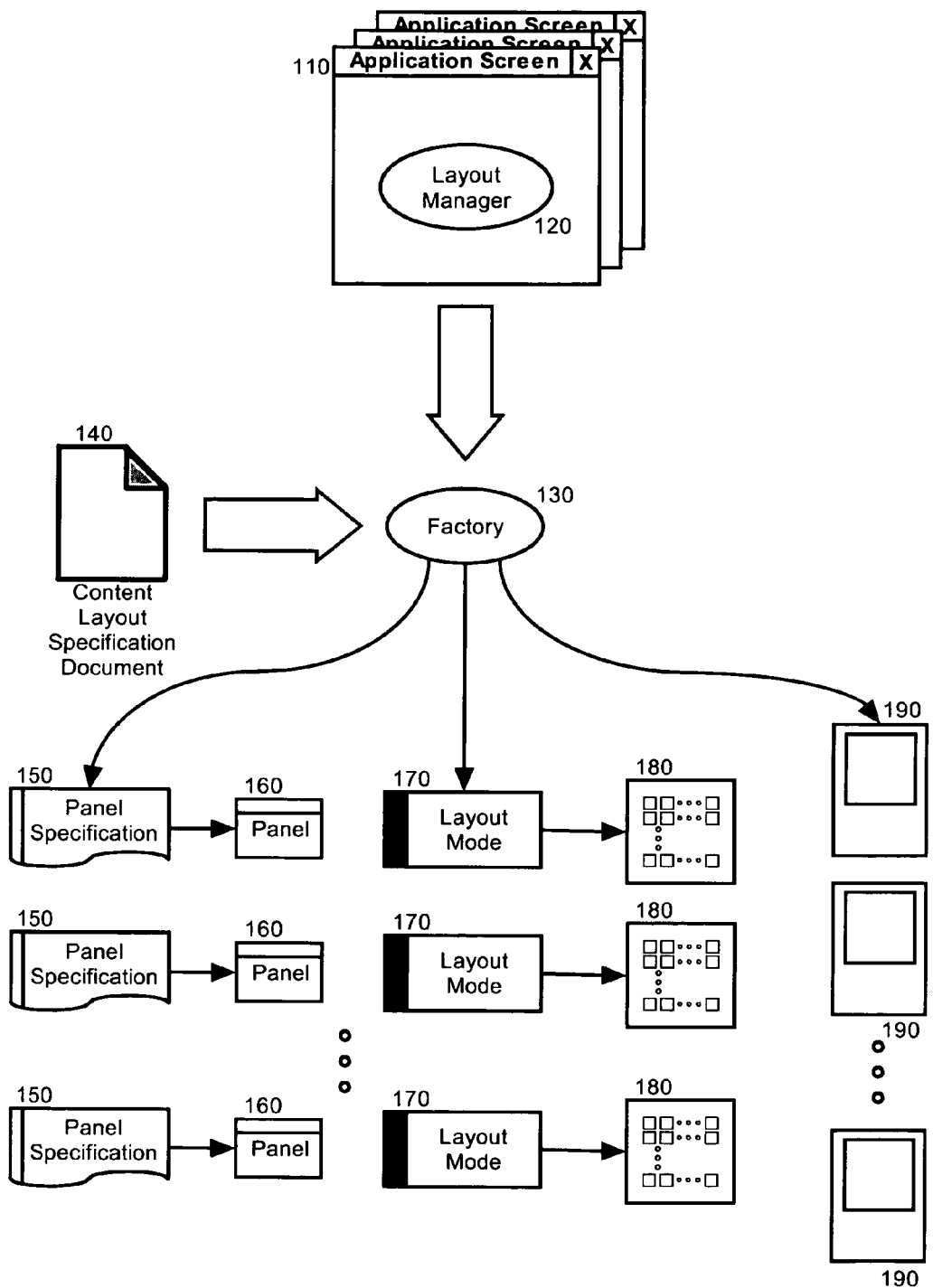
FIG. 1 is a pictorial illustration of dynamic content layout selection for pervasive device displays.

In more particular illustration, FIG. 1 is a pictorial illustration of dynamic content layout selection for pervasive device displays. As shown in FIG. 1, an application 110 intended for deployment in a pervasive device 190 can implement a layout manager interface 120. The layout manager interface 120 can provide logic to select a content layout 180 for GUI panels 160 for the application 110 which optimize the display space of the pervasive device 190 according to the display characteristics of the pervasive device 190. In this regard, a factory 130 coupled to the application 110 can produce a suitable display of panels 160 in a user interface for the application responsive to determining the display characteristics of the pervasive device 190 and matching those display characteristics to a corresponding pre-defined layout mode 170 specified in a content layout specification document 140.

In one embodiment of the invention, the pre-defined layout mode 170 can refer to a content layout 180 for a particular type of display, display characteristic or pervasive device 190. More particularly, the content layout 180 can indicate a number of rows in the display of the pervasive device 190 each that are to be used to hold one or more panels 160 of a GUI for the application 110. The content layout 180 further can specify a number of panels 160 to be included in any one of the rows. Notably, a panel 160 can be a separable portion of the GUI, such as a banner, form, control group, and the like. Each panel 160 can have a panel specification 150 including a textual definition of the display characteristics of the panel 160 including minimum, maximum and preferred lengths and widths, as well as preferred aspect ratio.

In operation, whenever a refresh event is detected for the display of a pervasive device 190, the display characteristics of the display can be determined and matched to a selection of layout modes 170 predefined in the content layout specification document 140. Once a match is identified, the content layout 180 for the identified layout mode 170 can be retrieved and utilized in arranging panels 160 for the GUI of the application 110 in the display of the pervasive device 190. The process can repeat for each refresh event detected. Optionally, a transition can be identified in the dimension of the display of the pervasive device 190 such that the transition from one type of display characteristic to another can trigger a change in layout mode 170 for the GUI of the application 110.

Figure 2:
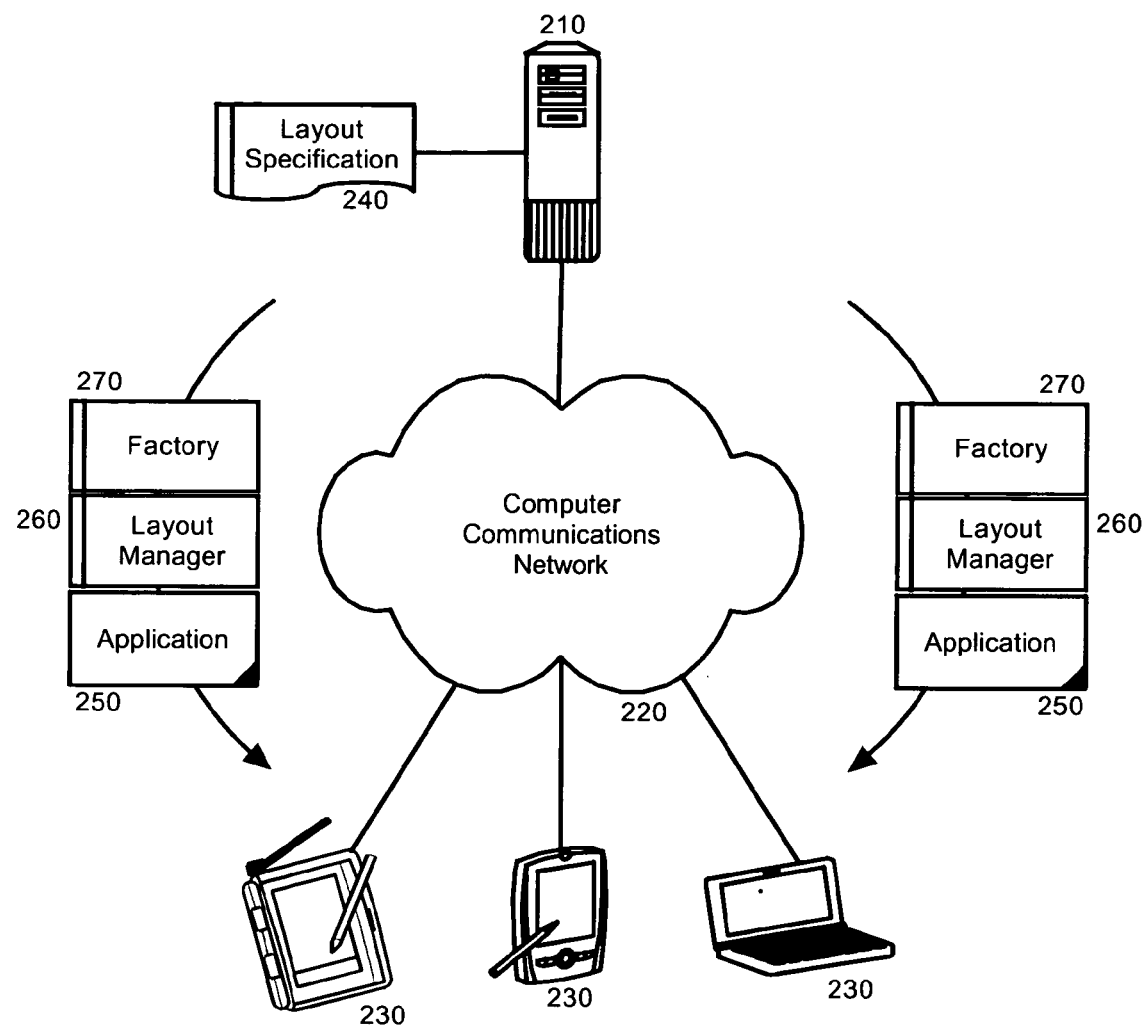
FIG. 2 is a schematic diagram illustrating a pervasive data processing system configured for dynamic content layout selection for pervasive device displays; and, FIG. 3 is a flow chart illustrating a process for dynamic content layout selection for pervasive device displays.

In yet further illustration, FIG. 2 is a schematic diagram illustrating a pervasive data processing system configured for dynamic content layout selection for pervasive device displays. As shown in FIG. 2, a pervasive data processing system can include an application server 210 coupled to one or more pervasive devices 230 over a computer communications network 220. The application server 210 can include a configuration for distributing applications 250 to requesting ones of the pervasive devices 230 over the computer communications network 220. In this regard, the applications 250 each can execute within a hosting one of the pervasive devices 230.

Notably, each of the applications 250 can implement an interface for a layout manager 260 which, once instantiated can be coupled to a factory 270. As such, the layout manager 260 and factory 270 each can execute within an associated one of the pervasive devices 230. Importantly, the layout manager 260 can include program code enabled to identify display characteristics for a host one of the pervasive devices 230. The display characteristics can include, for example, the display area and dimensions of the host one of the pervasive devices 230. Utilizing the display characteristics, the program code can be further enabled to select a pre-defined content layout for a GUI for the application 250 as specified within a layout specification 240.

In a preferred aspect of the invention, the layout specification 240 can be markup conforming to a schema defining a layout for content separated into panels and arranged in rows within the display. The schema further allows the specification of which panels to include in a display (and which to exclude by inference). The schema yet further allows for the definition of transition points indicating when one content layout is to be replaced with another due to a change in display characteristics. Finally, the schema can allow each panel to provide information regarding whether the panel can be resized and how, and a weight or willingness to be resized.

As an example, the following content layout specification references a set of panels and a set of layout modes along with a set of transitions:

```xml
<?xml version="1.0" encoding = "UTF-8"?>
<!DOCTYPE layoutspecification SYSTEM "layoutspecification.dtd">
<layoutspecification margin="2" padding="2" halign="left"
valign="top">
  <panel id="panel_1" resize="false" prefw="150" prefh="25"
  weight="0"/>
  <panel id="panel_2" resize="true" maintainaspect="true"
    minw="100" minh="100" prefw="150" prefh="25"
    maxw="200" maxh="200" weight="10"/>
  <panel id="panel_n" resize="false" prefw="150" prefh="25"
  weight="0"/>
  <layoutmode id="mode_1">
    <row><panel>panel_1</panel></row>
    <row><panel>panel_2</panel><panel>panel_n</panel></row>
  </layoutmode>
  <layoutmode id="mode_2">
    <row><panel>panel_2</panel><panel>panel_n</panel></row>
    <row><panel>panel_1</panel></row>
  </layoutmode>
  <layoutmode id="mode_n">
    <row><panel>panel_1</panel></row>
```

-continued

```
      <row><panel>panel_n</panel></row>
    </layoutmode>
    <transition ratio="1.5" from="mode_1" to="mode_2"/>
    <transition ratio="0.75" from="mode_2" to="mode_n"/>
</layoutspecification>
```

Once a layout mode has been selected by the layout manager 260 that corresponds to detected display characteristics for a host one of the pervasive devices 230, the attributes of the layout mode in the layout specification 240 can be provided to the factory 270 which in turn can create a GUI for the application 250 based upon the attributes of the layout mode. Subsequently, whenever a refresh event or rendering event is detected, the display characteristics once again can be determined and compared to the layout modes of the layout specification to determine whether a different content layout is required.

Figure 3:
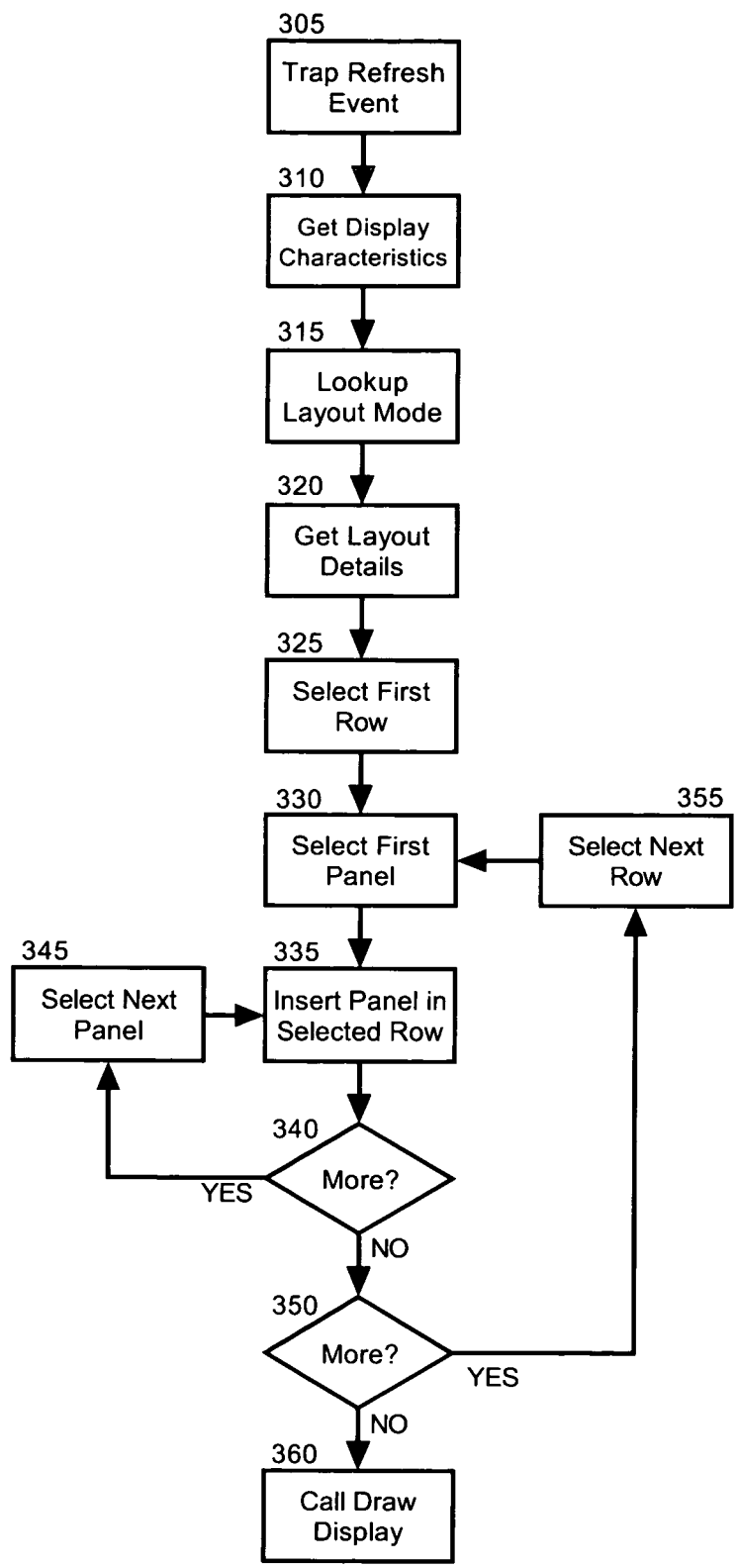

As yet further illustration of the operation of the layout manager 260, FIG. 3 is a flow chart illustrating a process for dynamic content layout selection for pervasive device displays. Beginning in block 305, a refresh (or render) event can be trapped responsive to which in block 310, display characteristics for a host pervasive device can be determined. In block 315, a layout mode can be located which corresponds to the display characteristics. For example, the height and width of the display of the pervasive device can be used as a search key for the layout mode.

In any case, in block 320, once a layout mode has been selected, in block 320, the attributes of the layout can be determined including the number of rows of panels to be rendered in the display of the pervasive device and the identity of the panels to be included in each row. Subsequently, in block 325, a first row in the display of the pervasive device can be selected and a first panel implicated by the layout mode can selected for disposition in block 330. As such, in block 335, the selected panel can be inserted in the selected row for rendering in the display of the pervasive device.

In decision block 340, if additional panels remain to be inserted in the row, in block 345 a next panel identified in the layout mode can be selected for insertion into the selected row. Thereafter, in block 336 the selected panel can be inserted into the selected row. The process can repeat for each remaining panel identified for insertion in the row in the layout mode. In decision block 340, when no further panels remain to be inserted in the selected row, in decision block 350 it can be determined if additional rows are specified by the layout mode. If so, in block 355 a next row can be selected and the process can repeat through block 330. When no further rows are specified by the layout mode, in block 360, the display can be rendered according to the content layout provided by the layout mode.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A dynamic content layout method for pervasive devices, the method comprising:
    obtaining display characteristics for a display of a host pervasive device;
    locating a layout mode of a plurality of layout modes corresponding to the obtained display characteristics, the layout mode referring to a content layout indicating a number of rows in the display of the host pervasive device each that are to be used to hold one or more panels of a graphical user interface (GUI) for the an application;
    arranging panels of a graphical user interface for the application in the host pervasive device according to the located layout mode; and,
    re-arranging the panels of the graphical user interface according to the located layout mode in response to a detecting a change in a dimension of the display of the host pervasive device matching a pre-defined dimensional transition ratio corresponding to the located layout mode, the transition ratio defining a relationship between a fixed width and fixed height of the display for which the change is detected.

2. The method of claim 1, further comprising:
    parsing a layout specification defined in markup; and,
    creating a layout mode object for each layout mode defined in the layout specification.

3. The method of claim 2, wherein locating a layout mode corresponding to the obtained display characteristics, comprises matching the display characteristics to a corresponding range of display attributes for each created layout mode object.

4. The method of claim 1, wherein arranging panels of a graphical user interface for an application in the host pervasive device according to the located layout mode, comprises:
    identifying a number of rows for display in the pervasive device, and particular ones of the panels to be placed in selected ones of the identified rows; and,
    inserting the selected ones of the panels in corresponding rows specified by the located layout mode.

5. The method of claim 1, further comprising:
- determining a transition from one layout mode to another in the layout specification;
- detecting a display event implicating the determined transition; and,
- re-arranging the panels of the graphical user interface for the application in the host pervasive device according to a layout mode specified by the transition.

6. The method of claim 1, further comprising re-arranging panels of a graphical user interface for an application in the host pervasive device according to a located layout mode for display characteristics of the display of the pervasive device responsive to detecting one of a refresh event and a rendering event.

7. A pervasive data processing system comprising:
- an application server;
- a plurality of applications managed for distribution by the application server, each of the applications implementing a layout manager interface;
- a layout specification for each of the applications, each layout specification defining a plurality of layout modes for a graphical user interface for a corresponding one of the applications, the layout mode referring to a content layout indicating a number of rows in a display of a host pervasive device each that are to be used to hold one or more panels of a graphical user interface (GUI) for a corresponding one of the applications, wherein each application is associated with display characteristics; and,
- a factory comprising program code enabled to generate the graphical user interface based upon the layout specification corresponding to each said application and to re-generate the graphical user interface based upon the layout specification in response to a detecting a change in a dimension of the display of the host pervasive device matching a predefined dimensional transition ratio specified within the layout specification, the transition ratio defining a relationship between a fixed width and fixed height of the display for which the change is detected.

8. The system of claim 7, wherein the layout specification comprises markup conforming to a schema and defining a plurality of panels for the graphical user interface, and a plurality of layout modes for different display characteristics of a pervasive device.

9. The system of claim 7, wherein the layout specification is disposed in the application server and configured for deployment to coupled pervasive devices.

10. The system of claim 8, wherein the markup further defines a plurality of transitions from one layout mode to another.

11. A computer program product comprising a non-transitory computer usable storage device embodying computer usable program code for dynamic content layout, the computer program product including:
- computer usable program code for obtaining display characteristics for a display in a host pervasive device;
- computer usable program code for locating a layout mode of a plurality of layout modes corresponding to the obtained display characteristics, the layout mode referring to a content layout indicating a number of rows in the display of the host pervasive device each that are to be used to hold one or more panels of a graphical user interface (GUI) for the application;
- computer usable program code for arranging panels of a graphical user interface for an application in the host pervasive device according to the located layout mode; and,
- re-arranging the panels of the graphical user interface according to the located layout mode in response to a detecting a change in a dimension of the display of the host pervasive device matching a predefined dimensional transition ratio corresponding to the located layout mode, the transition ratio defining a relationship between a fixed width and fixed height of the display for which the change is detected.

12. The computer program product of claim 11, further comprising:
- computer usable program code for parsing a layout specification defined in markup; and,
- computer usable program code for creating a layout mode object for each layout mode defined in the layout specification.

13. The computer program product of claim 12, wherein the computer usable program code for locating a layout mode corresponding to the obtained display characteristics, comprises computer usable program code for matching the display characteristics to corresponding display attributes for each created layout mode object.

14. The computer program product of claim 11, wherein the computer usable program code for arranging panels of a graphical user interface for an application in the host pervasive device according to the located layout mode, comprises:
- computer usable program code for identifying a number of rows for display in the pervasive device, and particular ones of the panels to be placed in selected ones of the identified rows; and,
- computer usable program code for inserting the selected ones of the panels in corresponding rows specified by the located layout mode.

15. The computer program product of claim 11, further comprising:
- computer usable program code for determining a transition from one layout mode to another in the layout specification;
- computer usable program code for detecting a refresh event implicating the determined transition; and,
- computer usable program code for re-arranging the panels of the graphical user interface for the application in the host pervasive device according to a layout mode specified by the transition.

16. The computer program product of claim 11, further comprising computer usable program code for re-arranging panels of a graphical user interface for an application in the host pervasive device according to a located layout mode for display characteristics of the display of the pervasive device responsive to detecting one of a refresh event and a rendering event.

* * * * *